United States Patent [19]
Roth et al.

[11] Patent Number: 5,358,266
[45] Date of Patent: Oct. 25, 1994

[54] WHEEL CHAIR ELECTRIC BRAKE AND PEDAL SAFETY KIT

[75] Inventors: Gail Roth, Miami; Henry Guenther, Manitoba, both of Canada

[73] Assignee: Salem Home Inc., Winkler, Canada

[21] Appl. No.: 90,580

[22] Filed: Jul. 12, 1993

[51] Int. Cl.$^5$ .............................................. A61G 5/00
[52] U.S. Cl. ........................... 280/304.1; 188/2 F; 297/423.25; 297/423.35; 297/DIG. 4
[58] Field of Search ............... 280/250.1, 304.1; 297/423.25, 423.26, 423.35, DIG. 4; 188/2 F, 19, 109

[56] References Cited

U.S. PATENT DOCUMENTS

| | | | |
|---|---|---|---|
| 3,790,212 | 2/1974 | Suyetani | 297/423.26 |
| 4,320,818 | 3/1982 | Knoche | 297/DIG. 4 |
| 4,623,043 | 11/1986 | Babilas | 188/109 |
| 4,988,114 | 1/1991 | Thornton, Jr. et al. | 280/304.1 |
| 5,203,433 | 4/1993 | Dugas | 188/2 F |

FOREIGN PATENT DOCUMENTS

| | | | |
|---|---|---|---|
| 2532485 | 2/1977 | Fed. Rep. of Germany | 188/2 F |
| 9014064 | 11/1990 | World Int. Prop. O. | 280/304.1 |

*Primary Examiner*—Margaret A. Focarino
*Assistant Examiner*—Victor E. Johnson
*Attorney, Agent, or Firm*—Adrian D. Battison; Stanley G. Ade; Murray E. Thrift

[57] ABSTRACT

A conventional wheel chair is modified by the provision of a safety system for automatically actuating the brakes of the wheel chair and lifting the foot rests when the weight of the patient is lifted from the seat. An overcenter spring arrangement is used to bias the brake mechanism into the braking position and is pulled over center by a solenoid actuated by a switch under the seat. The actuation of the brake mechanism is communicated to the foot pedals by a connection cable which pulls a latch pin to release the spring biased foot pedal into the retracted position.

13 Claims, 3 Drawing Sheets

WHEEL CHAIR ELECTRIC BRAKE AND PEDAL SAFETY KIT

This invention relates to a wheel chair and a kit of parts for attachment to a wheel chair for improving the safety of the patient. The majority of wheel chair rated accidents originate from the failure to lock the brakes and/or to raise the pedals to transfer in or out of the wheel chair. Such user negligence due to forgetfulness or preoccupation on the part of the user. Serious falls occur regularly due to the wheel chair rolling away at the time of transfer or due to the client stepping onto unraised foot pedals at the time of transfer. Such falls result in various injuries ranging from abrasions and skin tears to fractures and serious joint dislocations.

Health care workers have traditionally used an intervention approach to protect vulnerable clients from accidents during wheelchair transfers. They set up the supervision of vulnerable clients or they might use lap restraints to prevent the user from the transferring on their own. This compromises client independence and raises legal issues. In some cases the patient can even be placed in a gerichair further restraining and limiting independence.

A number of proposals have been made previously in patents and patent applications for devices which allow the brakes to be automatically applied when the patient rises from the seat. However these devices are not widely available in practice presumably due to their complexity or inefficiency.

SUMMARY OF THE INVENTION

It is one object of the present invention, therefore, to provide an improved safety device for attachment to a wheel chair.

According to the invention, therefore, there is provided a wheel chair comprising a frame, a seat bottom mounted on the frame for receiving and supporting the buttocks of a patient in a seated position, a seat back mounted on the frame against which the back of the seated patient can rest, ground wheels attached to the frame for wheeled movement of the frame and seated patient across the ground, a pair of foot rest elements located in a foot rest position forwardly of and downwardly from the seat bottom, each for receiving a respective foot of the seated patient to maintain the foot carried above the ground during the wheeled movement, and actuation means responsive to movement of the patient from the seated position to move the foot rest elements from the foot rest position to a retracted position allowing the patient to place the feet on the ground forwardly and downwardly of the seat bottom and to step forwardly therefrom without engaging the foot rest elements.

According to the second aspect of the invention there is provided a wheelchair comprising a frame, a seat bottom mounted on the frame for receiving and supporting the buttocks of a patient in a seated position, a seat back mounted on the frame against which the back of the seated patient can rest, ground wheels attached to the frame for wheeled movement of the frame and seated patient across the ground, the ground wheels including a pair of large rear wheels and a pair of smaller front castor wheels, a pair of brake members each mounted on a bracket at a side of the frame for pivotal movement from a brake release position to a brake engagement position in which the brake member is in engagement with a respective one of the large rear wheels, an attachment kit for automatic actuation of the brake member comprising a biasing spring connecting between the brake member and the frame and arranged to apply a braking force to the brake member into the engagement position, a solenoid mounted on the frame adjacent the brake member and arranged to cause said spring member to move the brake member into the brake engagement position, a battery mounted on the frame for providing power to the solenoid and switch means responsive to movement of the patient from the seated position to actuate said solenoid.

According to the third aspect of the invention there is provided a wheel chair comprising frame, a seat bottom mounted on the frame for receiving and supporting the buttocks of a patient in a seated position, a seat back mounted on the frame against which the back of the seated patient can rest, ground wheels attached to the frame for wheeled movement of the frame and seated patient across the ground, a pair of foot rest elements located in a foot rest position forwardly of and downwardly from the seat bottom, each for receiving a respective foot of the seated patient to maintain the foot carried above the ground during the wheeled movement, a pair of brake members each movable from a brake release position to a brake engagement position for engagement with a respective one of the wheels and a pair of cables each extending from a respective one of the brake members to a respective one of the foot rest elements, the cable being arranged to actuate movement of the foot rest element in response to movement of the brake member to the brake engagement position from the foot rest position to a retracted position allowing the patient to place the feet on the ground forwardly and downwardly under the seat bottom and to step forwardly therefrom without engaging the foot rest elements.

The preferred approach to the safety problem is therefore a preventative approach. It should safeguard the user yet promote independence. It should protect client autonomy while minimizing staff time required for supervision. It should make up for the deficiencies of the user.

The electric safety device of the present invention has been developed to meet the above described needs. Utilizing a pressure sensitive switch located beneath the seat of the wheel chair, device guarantees that the wheel chair will automatically lock and the pedals will raise as soon as the user's weight lifts off the seat of the chair. The mechanism required is relatively simple and without complexity. Moreover it can be developed as a kit to modify any wheel chair already in use. The concept can also be incorporated into the design of a new wheel chair. The designer can incorporate an on/off switch which can be used by the caregiver if they wish to turn the mechanism off. Batteries providing electrical power to the solenoid can be readily charged as required.

One embodiment of the invention will now be described in conjunction with the accompanying drawings in which:

DETAILED DESCRIPTION

Figure 1:
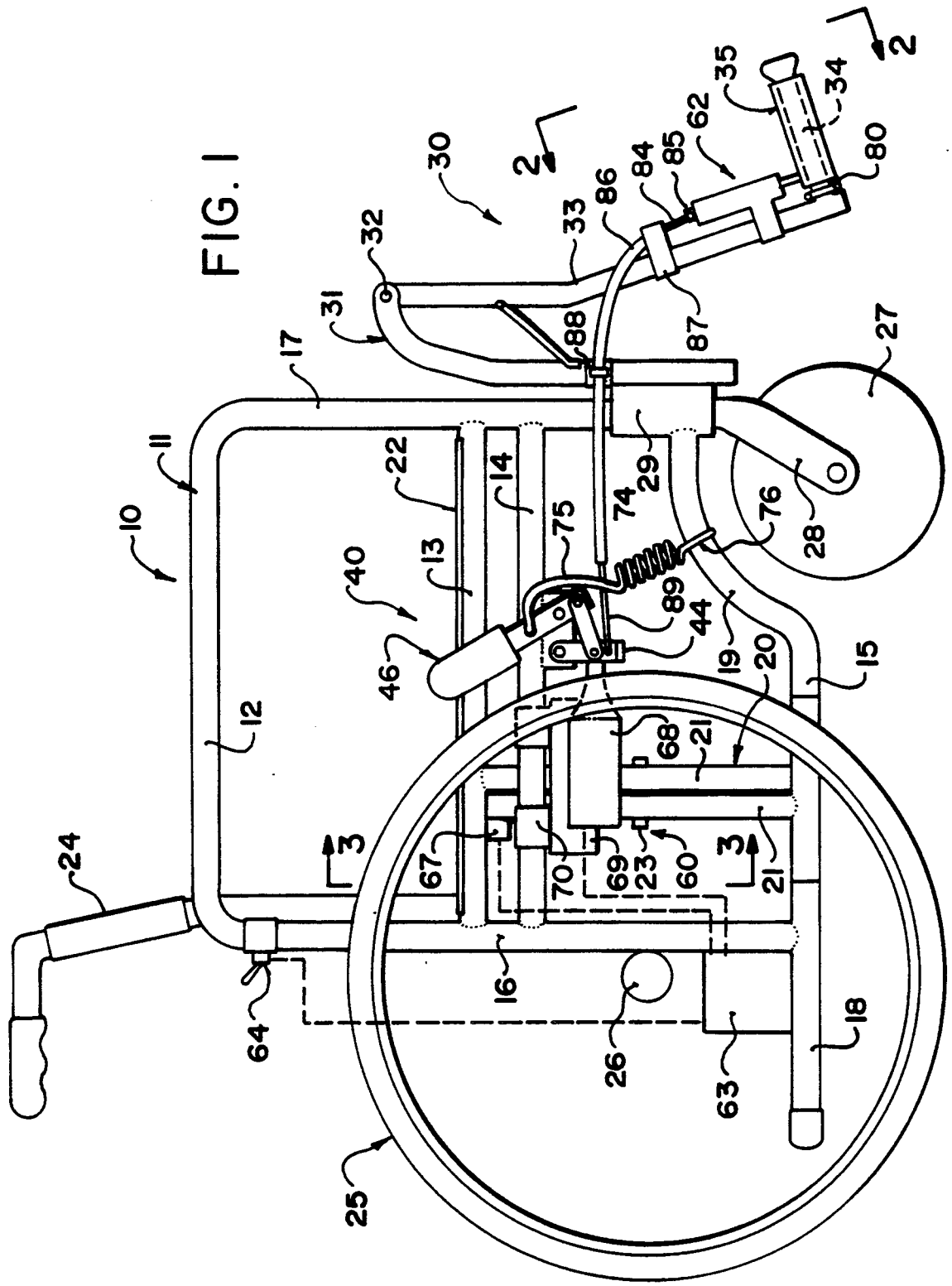
FIG. 1 is a side elevational view of a wheel chair of a conventional design including the safety attachment of the present invention.

A conventional wheel chair comprises a frame generally indicated at 10 including two side frame elements 11 only one of which is visible in FIG. 1 but it will be appreciated that the wheel chair of FIG. 1 is symmetrical about a centre line and the opposed side is identical to the side visible in FIG. 1. The side frame elements includes a loop frame structure standing in a vertical plane including a top horizontal rail 12, a first intermediate horizontal rail 13, a second intermediate horizontal rail 14 and a bottom rail 15. The horizontal rails are connected by a rear vertical post 16 and a front vertical post 17. The bottom rail 15 extends rearwardly beyond the vertical post 16 into a rearwardly projecting stub portion 18. The bottom rail 15 further includes a raised front section 19 which extends upwardly and over the front wheel or the wheel chair. The two side frames are interconnected by an X-frame structure 20 including cross braces 21 and 22 connected together at a pivot coupling 23. Each of the cross braces is connected at its lower end to a respective one of the bottom rails 15 and at its upper end to a respective one of the intermediate rails 13. A pivot coupling portion of those rails allows the X-frame to pivot as the two side frame portions 11 move together in a folding action.

Figure 2:
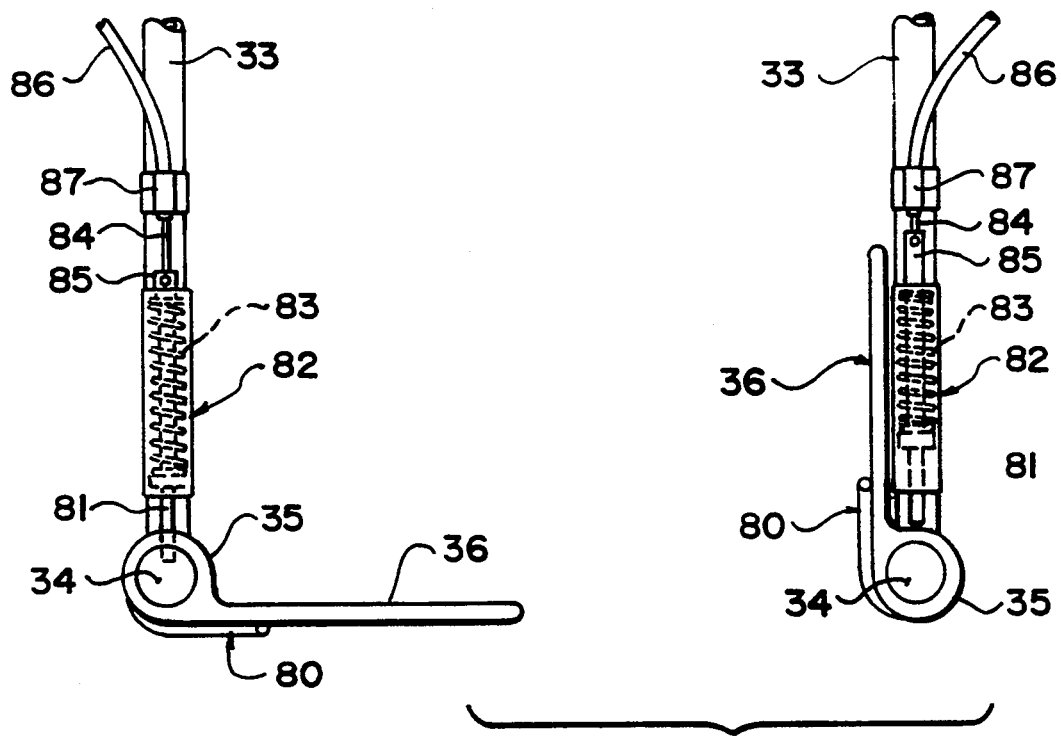
FIG. 2 is a view along lines 2—2 of FIG. 1.
Figure 3:
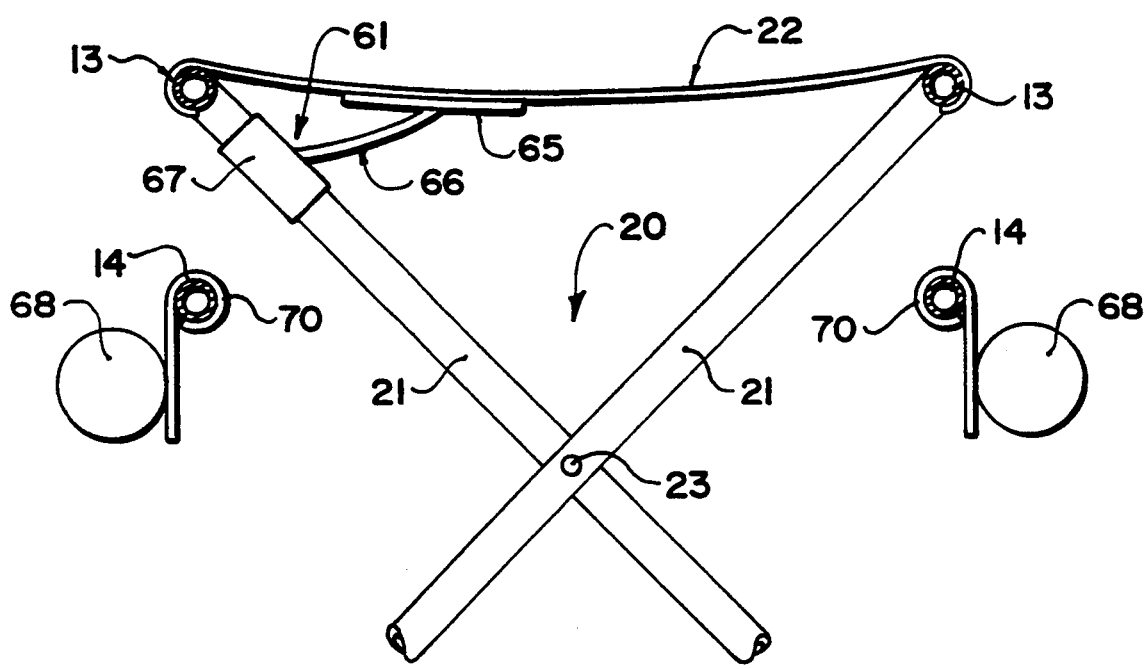
FIG. 3 is a cross sectional view along lines 3—3 of FIG. 1.

A seat bottom 22 of a flexible fabric material extends between the side rails 13 and thus moves slightly upwardly and downwardly in response to the weight of the patient resting thereon in a seated position. A seat back 24 extends upwardly and rearwardly and is again formed from a flexible fabric material mounted on a pair of posts each arranged at a respective side frame portion. A large rear wheel 25 is mounted on a hub 26 carried at the rear of the post 16. A front castor wheel 27 is mounted on a castor support 28 carried in a sleeve 29 mounted on the post 17. A foot rest element is generally indicated at 30 and is mounted on the front of the post 17. Each foot rest element includes a support post 31 extending upwardly parallel to the post 17. At the upper end the post 31 is inclined forwardly to a horizontal pivot pin 32 to which is attached a depending support leg 33 extending downwardly and forwardly from the post 17. The leg 33 is slightly cranked so the first portion is vertical while a second portion toward the ground is inclined forwardly and downwardly. At a base of the leg is mounted a stub shaft 34 which projects forwardly and slightly upwardly at a position just above the ground surface. The stub shaft 34 carries a sleeve 35 which is pivotal about a longitudinal axis of the stub shaft. On the sleeve is mounted a foot pad plate 36 which is welded to a lower inside edge of the sleeve so as to project horizontally inwardly in a foot receiving position shown on the left of FIG. 2. A stop member (not shown) prevents rotation of the sleeve 35 in a clockwise direction beyond the position shown in FIG. 2 so that the plate 36 is held generally horizontally to receive the foot of the patient at a position downwardly and forwardly of the front edge of the seat bottom to hold that foot during transportation of the patient across the ground. In the deployed foot receiving position, each of the plates 36 lies horizontally across the front area of the chair with the inside edges of the plates closely adjacent.

A brake mechanism 40 comprises a bracket 41 carried on the rail 14 and projecting downwardly therefrom. On the bracket 41 is carried a pivotal brake member 42 which includes a vertical plate lying parallel to the bracket 41 and pivotal relative thereto on a pivot pin 43. At the bottom end of the plate forming the brake member is provided a horizontal wheel engaging portion 44. In the release position shown in FIG. 1, the horizontal plate 44 is spaced from the periphery of the tire. In the actuated position shown in FIG. 4, the plate 44 is moved rearwardly into engagement with the periphery of the tire indicated at 45. The brake member 42 is pivoted to its release position and brake engaging position by a lever 46 having a handle 47 projecting upwardly from the rail 14. The lever 46 is mounted on the bracket 41 while pivotal movement about a pin 48. A low end of the lever projects downwardly from the bracket 41 and is connected to an actuating link 49 connected at one end by a pin 50 to the lever 46 and at the other end by a pin 51 to the brake member 42. Thus forward and rearward movement of the lever 46 causes movement of the brake member 42 to the braking position and release position respectively.

The above construction of a wheel chair is conventional and other designs are available with which the present invention can be used. The design above described provides only one example of a wheel chair in which the present invention can be used.

The safety attachment for the wheel chair comprises an automatic brake actuating mechanism generally indicated at 60, a seat switch 61 and a foot pedal automatic release mechanism generally indicated at 62.

The automatic safety system is powered by a battery 63 mounted at a suitable location on the frame and supported thereby. The main control switch 64 operable by the caregiver is mounted on the frame at a suitable location generally behind the patient. The seat switch 61 comprises a pad 65 which is attached to the flexible seat bottom 22 and acts to operate a lever 66 carry on a switch body 67 attached to one of the cross braces 21. The lever 66 is arranged so that, when the weight of the patient is removed from the seat bottom, the lever rises and actuates the switch 67 to communicate power from the battery 63 to one of the pair of solenoids 68.

On each side of the chair is mounted a brake actuating mechanism 60 and this comprises the solenoid 68 which is mounted upon a plate shaped bracket 69 suitably attached by collars 70 to the horizontal rail 14. The solenoid is arranged longitudinally of the rail and below the rail so that the application of power to the solenoid pulls an actuating rod 71 of the solenoid. The end of the rod 71 includes a collar 72 which engages around a rear end of the pin 51 of the brake mechanism.

The safety system further includes a spring 74 arranged to apply braking force to the brake mechanism. The spring 74 is mounted on a curved arm 75 which connects to the handle 46 at a position above the pivot pin 48. The lower end of the spring 74 is attached by a loop 76 to the frame at a suitable location thereon. The shape of the arm is such that the spring goes over centre as it passes from the release position shown in FIG. 1 to the brake engaging position shown in FIG. 4. Thus the spring acts to bias the brake device into both of the positions and simply pulled over centre by the actuation of the solenoid. The force of the solenoid is therefore not required to apply the braking action but is simply a trigger to pull the brake device over centre so that the force for the brake device is applied by the spring 74.

Figure 4:
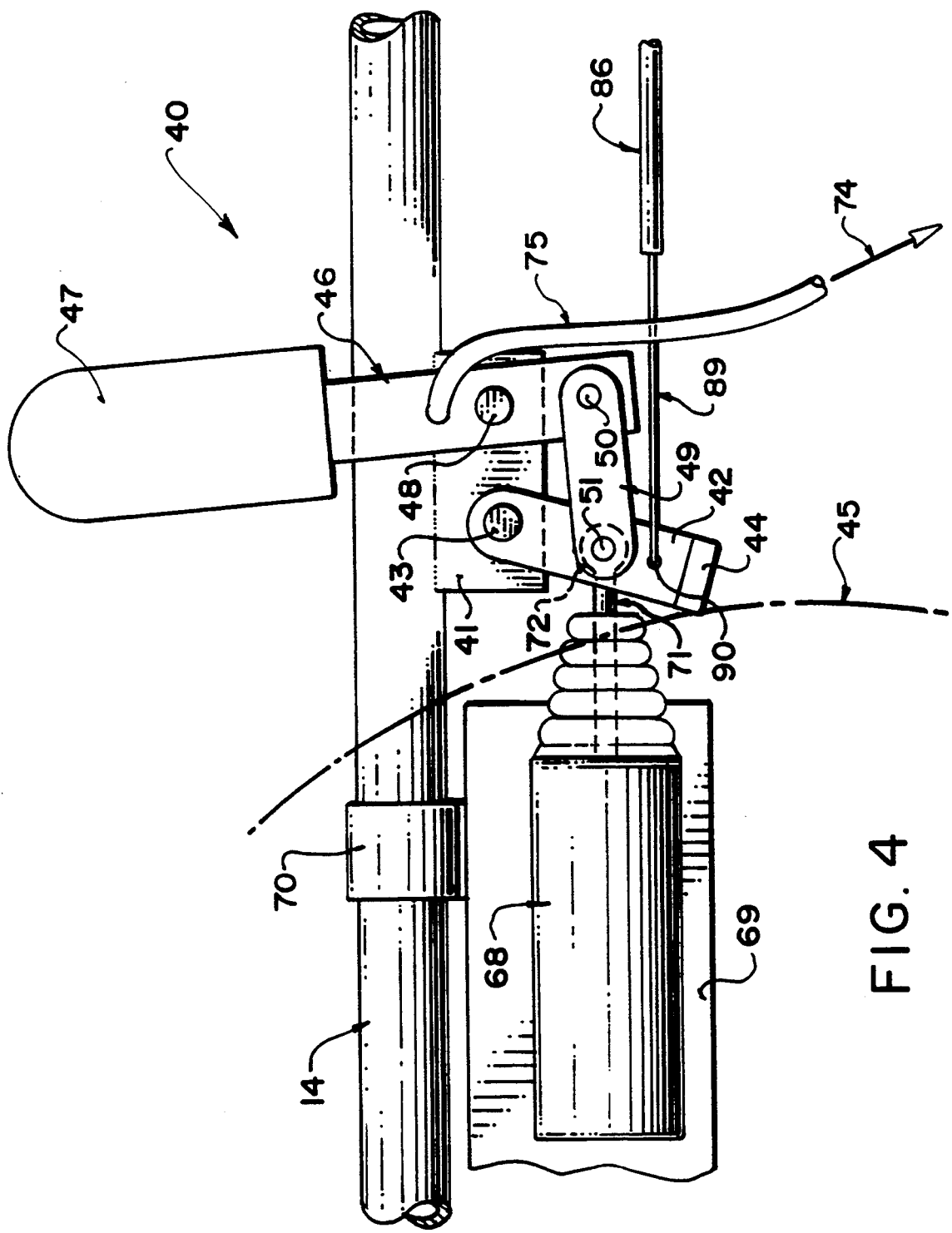
FIG. 4 is an enlarged view showing the brake assembly of FIG. 1 in the braking position.

The safety device further includes for each side of the chair a respective one of the pedal release mechanism 62. The pedal release mechanism comprises a spring 80 which is added to the post 34 and is coiled around the post so as to apply to the plate 36 a force biasing that plate into the raised or retracted position shown at the right hand side of FIG. 2. The normal or release position of the foot pedals is therefore the retracted position as shown on the right hand side of FIG. 2. The foot pedals are however latched in the foot receiving position shown on the left hand side of FIG. 2 by a pin 81 which engages through a hole in the top surface of the collar 35 and into the post 34 so as to lock the collar 35 in the foot receiving position. The pin 81 is carried in a sleeve 82 and is spring biased by a spring 83 into the latching position. The pin however can slide in the sleeve 82 against the bias of the spring pulled by a cable 84 attached to an upper end 85 of the pin 81. The cable is of the sheath type having an exposed lower end attached to the end of the pin. A sheath 86 of the cable is clamped between a lower clamp 87 on the leg 33 and the second clamp 88 on the post 31. The sheath is thus held in position and the cable can slide along the fixed sheath when pulled at its upper end. The upper end of the cable is indicated at 89 and is attached as best shown in FIG. 4 to a hole 90 in the brake device 42. Thus the operation of the brake device by the solenoid and spring arrangement also causes the cable to be pulled upwardly relative to the sleeve 82 that is pulling the pin from the latching position and automatically releasing the foot pedal into the retracted position.

In operation, therefore, with the patient seated, the brake can be manually removed to the release position and the foot pedals moved downwardly into the foot receiving position again by manual operation by the caregiver. The foot pedals are latched in position by the latch pins and the brake devices are held in the release position by the over centre spring. However when the patient lifts their weight from the chair for transfer either under their own volition or under the control of the caregiver, the brake mechanism is immediately applied and the foot pedals are raised. The patient when lifting their weight from the chair places their feet behind the foot pedals on the ground and the lifting of the foot pedals immediately allows access for the patient to step forwardly without any danger of engaging the foot pedals which can cause tripping or falling.

The design of the device including the simple solenoid and over centre spring arrangement together with the cable connection to the foot pedals allows simple retrofit onto existing wheel chairs of a simple and relatively inexpensive kit.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A wheel chair comprising a frame, a seat bottom mounted on the frame for receiving and supporting the buttocks of a patient in a seated position, a seat back mounted on the frame against which the back of the seated patient can rest, ground wheels attached to the frame for wheeled movement of the frame and seated patient across the ground, a pair of foot rest elements located in a foot rest position forwardly of and downwardly from the seat bottom, each for receiving a respective foot of the seated patient to maintain the foot carried above the ground during the wheeled movement, and actuation means responsive to movement of the patient from the seated position to effect movement of the foot rest elements from the foot rest position to a retracted position allowing the patient to place the feet on the ground forwardly and downwardly of the seat bottom and to step forwardly therefrom without engaging the foot rest elements, wherein said actuation means includes a switch actuable by the lifting of the weight of the patient from the seat bottom.

2. The wheel chair according to claim 1 wherein the foot rest elements are each mounted on a respective one of a pair of forwardly extending posts with each foot rest element being pivotal about a longitudinal axis of the post from the foot rest position extending horizontally from the post inwardly to the retracted position extending vertically upwardly from the post.

3. The wheel chair according to claim 2 including spring means biasing the foot rest element to the retracted position and latch means for latching the foot rest element in the foot rest position, said actuation means being arranged to release said latch means.

4. The wheel chair according to claim 3 wherein said actuation means includes a pair of cables each extending to a respective one of the foot rest elements, each cable being movable longitudinally to actuate release of said latch means.

5. The wheel chair according to claim 1 including a pair of brakes, each actuable to cause braking of a respective one of said ground wheels, said actuation means being arranged to actuate the brakes.

6. The wheel chair according to claim 5 wherein the actuation means includes a cable extending from the brake to a respective one of the foot rest elements for actuating movement of the foot rest element from the foot rest position to the retracted position.

7. The wheel chair according to claim 1 wherein the actuation means includes a pair of solenoids, each for effecting said movement of a respective one of said footrests, and a battery mounted on the frame and arranged to provide power to the solenoids, said switch being arranged for actuating said solenoids.

8. The wheel chair according to claim 7 wherein the frame includes a pair of horizontal rails each extending along a respective side of the frame, a pair of brackets each mounted on a respective one of the rails and a pair of brakes each pivotally mounted on a respective one of the brackets for movement into engagement with a respective one of the wheels and wherein each of the solenoids is mounted on the respective mounting bracket carried on the respective rail and extending longitudinally of the respective rail for actuating the respective brake.

9. The wheel chair according to claim 8 wherein the actuation means includes a cable extending from each brake to a respective one of the foot rest elements.

10. The wheel chair according to claim 8 wherein the brake is movable between the engagement position and a release position and wherein there is provided spring means shaped and arranged to move from a first orientation in which the spring means biases the brake means into the release position to a second orientation in which the spring means biases the brake means into the engagement position, the solenoid being arranged to pull the brake means such that the spring means moves from the first orientation into the second orientation.

11. A wheel chair comprising a frame, a seat bottom mounted on the frame for receiving and supporting the buttocks of a patient in a seated position, a seat back mounted on the frame against which the back of the seated patient can rest, ground wheels attached to the frame for wheeled movement of the frame and seated patient across the ground, a pair of foot rest elements located in a foot rest position forwardly of and downwardly from the seat bottom, each for receiving a respective foot of the seated patient to maintain the foot carried above the ground during the wheeled movement, a pair of brake members each movable from a brake release position to a brake engagement position for engagement with a respective one of the wheels and a pair of actuating linkages each extending from a respective one of the brake members to a respective one of the foot rest elements, each actuating linkage being arranged to actuate movement of the foot rest element, in response to movement of the brake member to the brake engagement position, from the foot rest position to a retracted position allowing the patient to place the feet on the ground forwardly and downwardly under the seat bottom and to step forwardly therefrom without engaging the foot rest elements.

12. The wheel chair according to claim 11 wherein the foot rest elements are each mounted on a respective one of a pair of forwardly extending posts with each foot rest element being pivotal about a longitudinal axis of the post from the foot rest position extending horizontally from the post inwardly to the retracted position extending vertically upwardly from the post.

13. The wheel chair according to claim 11 including spring means biasing the foot rest element to the retracted position and latch means for latching the foot rest element in the foot rest position, said actuating linkage being arranged to release said latch.

* * * * *